United States Patent [19]
Osanai

[11] 4,195,796
[45] Apr. 1, 1980

[54] TAPE CASSETTE

[75] Inventor: Akira Osanai, Hachioji, Japan

[73] Assignee: Olympus Optical Co., Ltd., Tokyo, Japan

[21] Appl. No.: 891,350

[22] Filed: Mar. 29, 1978

[30] Foreign Application Priority Data

Mar. 31, 1977 [JP] Japan .............................. 52-40002[U]
Mar. 31, 1977 [JP] Japan .............................. 52-40003[U]
Mar. 31, 1977 [JP] Japan .............................. 52-40004[U]
Mar. 31, 1977 [JP] Japan .............................. 52-40005[U]

[51] Int. Cl.² .............................................. G03B 1/04
[52] U.S. Cl. ................................... 242/199; 242/180
[58] Field of Search .............. 242/55, 19 A, 199–200, 242/180; 352/31, 72, 78; 360/96, 132

[56] References Cited

U.S. PATENT DOCUMENTS 3,625,454  12/1971  van der Maaden et al. ........ 242/180

*Primary Examiner*—Leonard D. Christian
*Attorney, Agent, or Firm*—Toren, McGeady and Stanger

[57] ABSTRACT

A tape cassette comprises a housing for accommodating a magnetic tape therein, tape hubs provided at a predetermined position on the housing for winding the tape therearound, and opening window portions provided at opposite sides of the housing and accessible to the tape.

6 Claims, 9 Drawing Figures

U.S. Patent  Apr. 1, 1980  Sheet 3 of 3  4,195,796
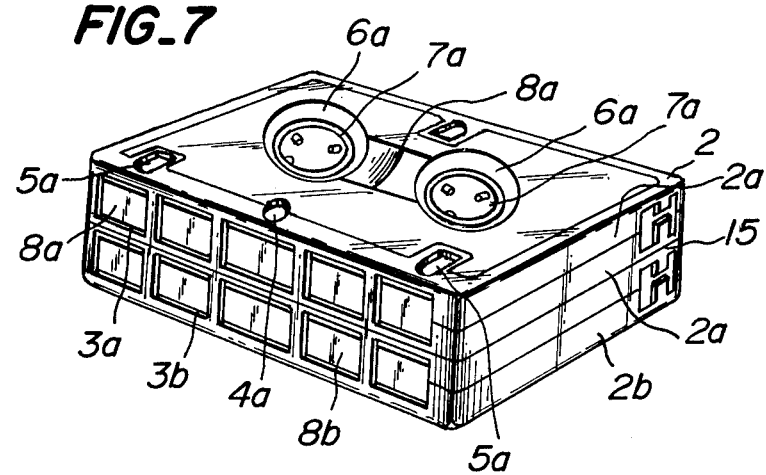
FIG_7
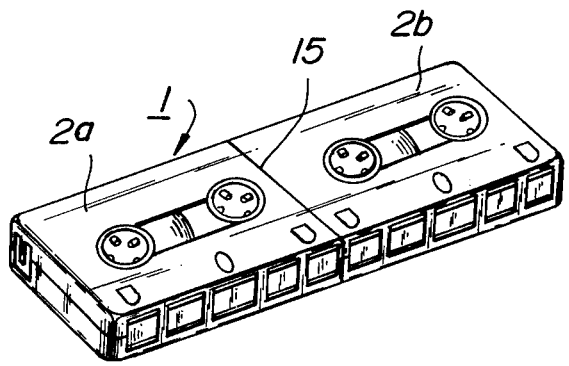
FIG_8
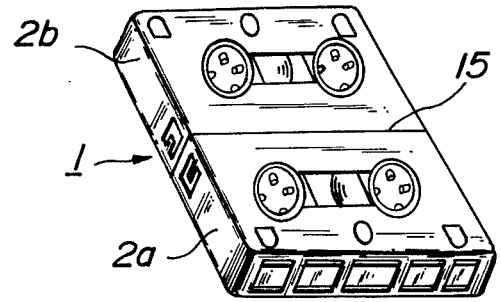
FIG_9

TAPE CASSETTE

BACKGROUND OF THE INVENTION

1. Field of the Invention

The present invention relates to a tape cassette for use in tape players such as a vehicle stereo player and the like.

2. Description of the Prior Art

Recently, a very small microcassette having the size of about ¼ of a so-called compact cassette has been popular. The associated tape recorder device has also been physically reduced, so that such device becomes easy to carry.

However, if a cassette becomes too small, its handling, i.e., insertion into and detachment from a tape recorder, becomes inconvenient, and recording and reproducing time becomes short because of this smallness. In order to play such cassettes for a long time (e.s. hours), therefore, it is necessary to exchange the cassette quite often. Particularly, in the case of exchanging a cassette when driving a car, a certain size of the cassette is required and it is desirable to play music for a long time with a single cassette.

SUMMARY OF THE INVENTION

An object of the present invention is to satisfy the above requirement.

Another object of the present invention is to provide a tape cassette provided with opening portions on the surface opposite to a housing, respectively, thereby recording and reproducing from either opening, allowing easy handling, and providing long performance time.

A further object of the present invention is to provide a tape cassette suitable for a tape player such as a portable or vehicle stereo, comprising an elongate housing arranged with two pairs of hubs on one straight line and provided with an opening window on the long side surface of a side wall of the housing, thereby simplifying handling and performing music or the like for a long time.

An even further object of the present invention is to provide a tape cassette suitable for a tape player such as a portable or vehicle player stereo, in which provision is made for a pair of hubs provided in the upper and lower portions through a partition by winding a tape therearound, so as to operate it simply and to play music for long time.

An additional object of the present invention is to provide a portable or vehicle stereo tape cassette for easy handling and playing for a long time by coupling two tape cassettes and securing the coupled portion by ultrasonic welding, and projecting one tape cassette from the device in use.

According to the present invention, a tape cassette comprising a housing for accommodating a magnetic tape therein, tape hubs provided at a predetermined position on the housing for winding the tape therearound, and opening window portions provided at opposite sides of the housing and accessible to the tape. A tape cassette comprises a housing for accommodating a magnetic tape therein, two pairs of tape hubs provided at the given position on the housing on a straight line for winding the tape therearound, and opening window portions provided at one side of the housing in parallel to a pair of tape hubs and accessible to the tape. A tape cassette comprises a housing for accommodating a magnetic tape therein, a pair of tape hubs provided at the upper and lower portions through an intermediate partition of the housing for winding the tape therearound, and opening window portions provided through the intermediate partition on one side of the housing, respectively. A tape cassette for a mobil stereo comprises two housings of comparatively small-sized tape cassette, the housing being made into contact with each other and the contact portions being integrally formed by adhering with ultrasonic welding.

BRIEF DESCRIPTION OF THE DRAWING

FIGS. 7, 8 and 9 are perspective views showing a forth embodiment of the tape cassette according to the present invention, respectively.

DESCRIPTION OF THE PREFERRED EMBODIMENT

Figure 1:
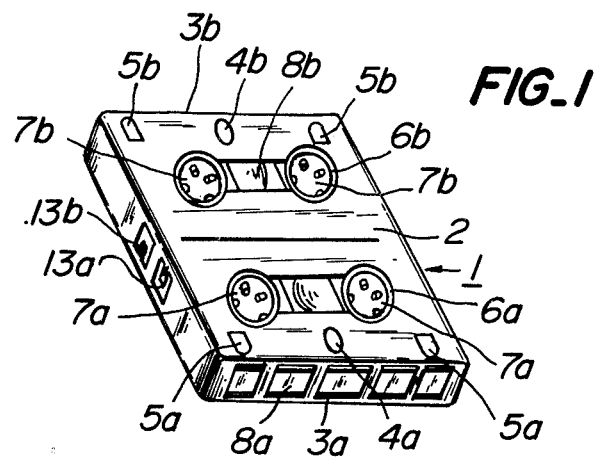
FIG. 1 is a perspective view showing a first embodiment of a tape cassette according to the present invention.
Figure 2:
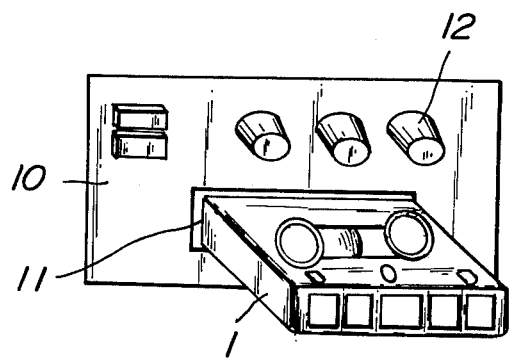
FIG. 2 is a perspective view showing a condition setting the cassette to a portable or vehicle stereo player.

Referring now to FIGS. 1 and 2, a first embodiment of a tape cassette according to the present invention is shown.

A cassette housing 2 of a tape cassette 1 molded and processed with synthetic resin or the like comprises an upper housing and a lower housing, back surfaces of which are abutted one upon the other so as to form a rectangular housing as illustrated.

A short side surface opposed to the housing 2 is partitioned to have five windows, having first and second opening portions 3a, 3b, provided with two pairs of lugs 13a, 13b for preventing erroneous erasing, which are projected in different directions, respectively.

On the other hand, the upper and lower surfaces of the housing 2 are symmetrically provided with capstan shaft holes 4a, 4b and a pair of cassette engaging holes 5a, 5b adjacent respective opening portions 3a, 3b, and the center portion of the housing 2 is provided with a pair of driven shaft insertion holes 6a, 6b in parallel to respective opening portions 3a, 3b.

The driven shaft insertion holes 6a, 6b are provided with a pair of tape hubs 7a, 7b, respectively, and magnetic tapes 8a, 8b are wound from one tape hub to the other of a pair of hubs through the opening portion.

When the tapes 8a, 8b are used by inserting into a main body 10 such as a vehicle stereo by means of pat springs (not shown) provided in the openings 3a, 3b, respectively, the tapes 8a, 8b are well pressed to a magnetic head.

In addition, the cassette engaging holes provided near the opening portions do not become a hindrance when a capstan shaft is inserted. Further, it is preferable to provide a partition wall in parallel to the opening at the center of the housing 2.

The tape cassette 1 thus formed is inserted into one opening portion 3a of the cassette 1 from a cassette insertion 11 of the car stereo 10 and a switch 12 is ON, so that the capstan shaft and the driven shaft are interlocked so as to insert the magnetic head into the cassette and reproduction starts by driving the tape. In this case, the car stereo detects completion of a tape performance at the final end, automatically changes its channel, reverses the tape, and starts reproduction of music or the like. This reproduction is a so-called auto-reverse system, so that after confirmed finished reproduction by reciprocal movement, the cassette is taken out.

In addition, this cassette is not only reversed by the auto-reverse system but a tape can be rewound automatically after the performance is completed in one direction.

Then, the cassette 1 is reversed and both surfaces of the other opening portion 3b are used. When the cassette is thus used, a half of the cassette housing is always projected from the cassette insertion hole, so that the cassette can easily be detached, and since the tape for two of the usual cassette is inserted in the housing, one cassette is usable for a long time. Accordingly, such cassette is very advantageous for an automobile which only has a tiny space for a cassette.

Figure 3:
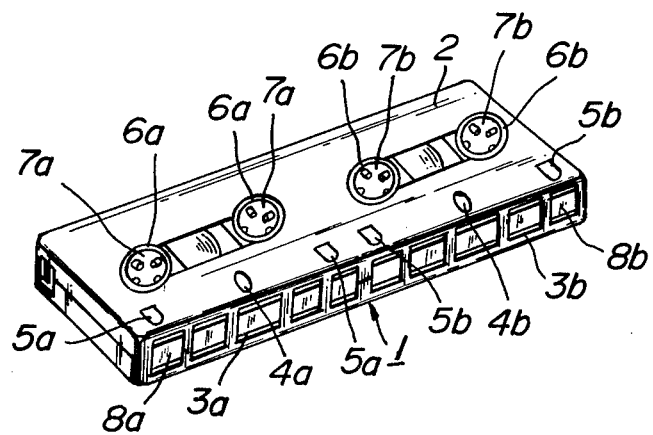
FIG. 3 is a perspective view showing a second embodiment of the tape cassette according to the present invention.
Figure 4:
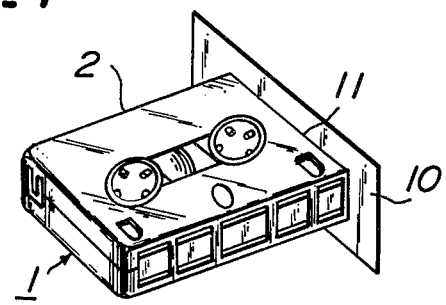
FIG. 4 is a perspective view showing the condition of applying the cassette to the car stereo.

A second embodiment of the tape cassette according to the present invention is shown in FIGS. 3 and 4. In this embodiment, an elongate housing 2 of a tape cassette 1 is formed with synthetic resin or the like and consists of an upper housing and a lower housing.

On one long side surface of the housing 2 are formed two pairs of opening windows 3a, 3b almost over the whole surface thereof, and in order to correspond to these opening windows 3a, 3b, two pairs of capstan holes 4a, 4b and engaging holes 5a, 5b are bored at predetermined positions, respectively.

Further, at center portions of the upper and lower surfaces of the housing 2 are bored two pairs of driving shaft insertion holes 6a, 6b on one straight line.

The above driving shaft insertion holes 6a, 6b are provided with rotatable tape hubs 7a, 7b, respectively, and magnetic tapes 8a, 8b are wound by every pair of the tape hubs 7a, 7b. The tapes 8a, 8b are wound from one tape hub to the other tape hub through respectively corresponding opening windows 3a, 3b.

The engaging holes 5a, 5b provided near the above opening windows 3a, 3b can be inserted into the capstan shaft.

Further, the magnetic tapes 8a, 8b are well pressed to the magnetic head by a pad spring (not shown) provided in the inside of the opening windows 3a, 3b when the tapes are inserted into a car stereo.

The thus formed tape cassette 1 is used for a tape player 10 such as a vehicle stereo or the like. In this case, its detachment is very easy. That is, as shown in FIG. 4, from a cassette insertion inlet 11 of the car stereo is inserted a half of the cassette 1. That is, the housing 2 is pushed in more than halfway, thereby driving one magnetic tape and starting performance.

In this case, the remaining housing portion is used as a knob when pulling out the cassette 1, so that the cassette can easily be detached.

Further, since two tapes are put in one cassette, long performance can be possible and it is advantageous in a small space such as an automobile.

Figure 5:
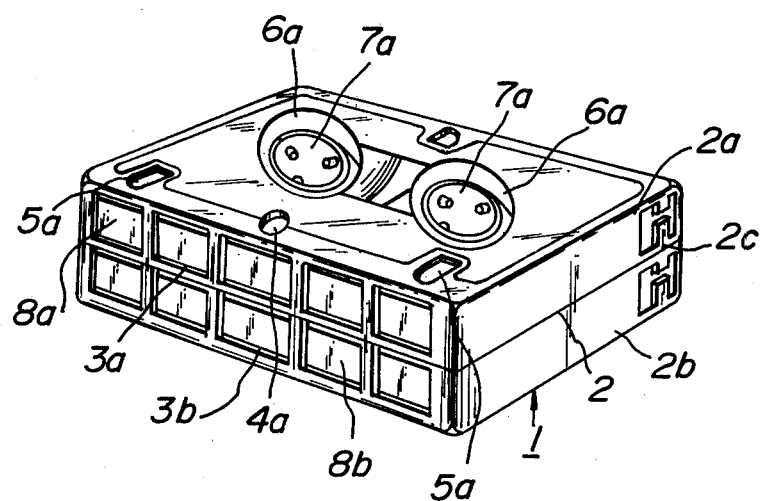
FIG. 5 is a perspective view showing a third embodiment of the tape cassette according to the present invention.
Figure 6:
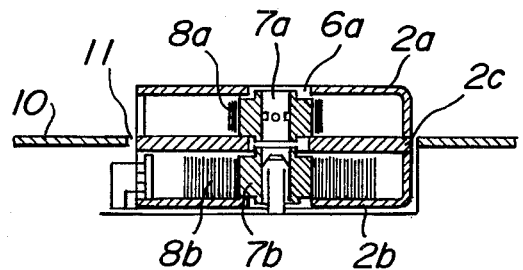
FIG. 6 is a cross-sectional view showing a condition applying the cassette to the portable or vehicle stereo.

A third embodiment of the tape cassette is shown in FIGS. 5 and 6. In this embodiment, the housing 2 of the tape cassette 1 is formed with synthetic resin or the like and provided with an upper housing 2a and a lower housing 2b sandwiching a partition 2c therebetween.

The above housing 2 is so arranged that the opening windows 3a, 3b provided on one side surface of the upper and lower housings 2a, 2b facing in the same direction.

Near the opening windows 3a, 3b are bored a capstan shaft hole 4a at the center and the capstan shaft and engaging hole 4b on both sides of the upper and lower housings 3a, 2b and the partition 2c.

At the center portions of the upper and lower housings 2a, 2b and the partition 2c are bored a pair of through-holes 6a, and between the upper housing 2a of the through-hole 6a and the partition 2c and between the partition 2c and the lower housing 2b are rotatably provided a pair of tape hubs 7a, 7b.

On the tape hubs 7a, 7b of each pair are wound a predetermined amount of magnetic tapes 8a, 8b which are wound from one hub to the other hub through the opening windows 3a, 3b.

In addition, the engaging hole 4a provided near the above opening windows 3a, 3b can pass the capstan shaft (not shown).

The magnetic tapes 8a, 8b can be pressed to a magnetic head by means of a pat spring (not shown) provided inside when using it by inserting into the car stereo.

When the thus formed tape cassette 1 is used for a tape player such as a car stereo, it is easily detached.

As shown in FIG. 6, the cassette 1 is inserted from the cassette insertion inlet 11 of the car stereo 10 in the flat condition from above, so as to insert only the lower housing 2a portion. Therefore, only the lower side tape inserted in the device of the cassette is driven separately from the upper side tape and music or the like in the tape can be reproduced.

In this case, the portion projected upwards the cassette filled in the car stereo becomes a knob when pulling out of the cassette, so that detachment of the cassette becomes very easy and an ejector device or the like having a complicated mechanism is not required.

The car stereo device automatically switches its channel after detecting the final end of completion of tape performance and starts reproduction of music or the like. This is a so-called auto-reverse system, in which reproduction by reciprocal movement is confirmed to be finished and then the cassette is taken out by means of a knob, and the tape is reversed and used.

This cassette is not necessarily an auto-reverse system, but after completed performance in one direction, the tape is automatically rewound. Thus, it can be used such as 2 channels and 4 tracks for freely selecting one from two channels of a car stereo.

With such use, the reproduction time of the cassette becomes twice the usual one, and a convenient cassette can be provided in view of preservation and safety drive for a narrow space in the automobile.

A fourth embodiment of the tape cassette according to the present invention is shown in FIGS. 7, 8 and 9. In this embodiment, a magnetic tape cassette 1 adhered by ultrasonic heating or welding is formed with a housing 2 by superimposing an upper housing 2a and lower housing 2b made of synthetic resin or the like one upon the other, five opening windows 3a, 3b provided on one long side surface of the housing 2.

A capstan shaft hole 4a is bored at the center near the above five windows 3a, 3b by passing through the upper and lower surfaces of the housing 2, and engaging holes 5a are bored on both sides thereof. In this case, the above engaging holes 5a are co-used as a capstan shaft hole, respectively. Further, on the upper and lower surfaces of the housing 2 are bored a pair of driving shaft insertion holes 6a at the center portion thereof, and a pair of tape hubs 7a are rotatably arranged on the insertion holes 6a.

A predetermined amount of magnetic tape 8a is wound around the tape hub 7a, and the tape is wound from one tape hub to the other tap hub through the opening window 3a of the housing 2.

Further, a pat spring (not shown) is provided at a position close to the magnetic tape 8a in the housing 2.

That is, in the present embodiment, the first tape cassette 2a is superimposed on the second tape cassette 2b for directing them in the same direction, and each contact portion 15 is adhered and secured by ultrasonic heating or welding so as to integrate two cassettes and to construct a car stereo cassette 1.

In the case of using the thus constructed cassette 1 as a car stereo, if the cassette is inserted from the above to the device, the first cassette 2a for instance is filled in the device and the second cassette 2b portion is projected on the device as a knob. Therefore, the projected second cassette portion can be used as a knob for taking the cassette out.

After inserting the above cassette, the tape is driven and desired music or the like can be reproduced. As a result, hour long performance can be reproduced by a single cassette. Further the cassette is comparatively large for easy carrying and handling.

Further, two conventional small-size cassettes are used by adhering with each other, so that it is simple to construct without changing a metal mold or making other provisions.

FIG. 8 shows the windows 3a, 3b of two cassettes 2a, 2b aligned in series and each being adhered by ultrasonic welding on respective side walls, having the same function and effect as in the above embodiment. FIG. 9 is similar to FIG. 8, but the back surfaces of the cassettes 2a, 2b are molten by ultrasonic welding, and this cassette does not need to automatically reverse when the tape is ended.

As described above, usually used cassettes are integrated by ultrasonic fusing and used so as to make handling and operation easy and a preferable cassette for a car stereo can be provided.

What is claimed is:

1. A tape cassette for use in a vehicle stereo record/playback unit comprising:
    a housing for accommodating magnetic tape therein, said housing having two open window portions on different portions of the housing for access to the tape;
    a first pair of tape hubs provided in one portion of the housing;
    a first length of sound recording tape for being wound and rewound between said first pair of hubs, a portion of said tape being disposed across one of said window portions;
    a second pair of tape hubs provided in another portion of the housing; and
    a second length of sound recording tape for being wound and rewound between said second pair of hubs, a portion of said second length of tape being disposed across the other of said window portions.

2. The tape cassette of claim 1, wherein said window portions are on opposite sides of the housing.

3. The tape cassette of claim 1, wherein said window portions are on the same side and are colinear.

4. The tape cassette of claim 1, wherein the window portions are on the same side of the housing but one above the other.

5. The tape cassette of claim 1, wherein said first pair of tape hubs and the first tape length are in one sub-portion of the housing and said second pair of tape hubs and the second tape length are in another sub-portion, said two sub-portions being operationally independent of each other.

6. The tape cassette of claim 5, wherein said two sub-portions are complete subhousings, said subhousings being bound to each other by ultrasonic welding.

* * * * *